United States Patent [19]

Moretto et al.

[11] 4,214,066

[45] Jul. 22, 1980

[54] ORGANOPOLYSILOXANES MODIFIED WITH POLY-CARBODIIMIDE

[75] Inventors: Hans-Heinrich Moretto, Cologne; Helmut Steinberger, Leverkusen, both of Fed. Rep. of Germany; Ingrid Larking, Landvetter, Sweden; Hans Sattlegger, Odenthal-Gloebusch, Fed. Rep. of Germany

[73] Assignee: Bayer Aktiengesellschaft, Leverkusen, Fed. Rep. of Germany

[21] Appl. No.: 918,128

[22] Filed: Jun. 22, 1978

[30] Foreign Application Priority Data

Jul. 7, 1977 [DE] Fed. Rep. of Germany ....... 2730743

[51] Int. Cl.$^2$ ............................................. C08G 77/04
[52] U.S. Cl. ................................... 528/28; 260/18 S; 260/29.1 SB; 525/452; 525/474; 528/17; 528/18; 528/23; 528/33; 528/34; 528/44; 106/287.14; 525/453; 525/457

[58] Field of Search ....................... 528/28, 23, 33, 34, 528/44, 46, 47, 17, 18; 260/824 R, 825, 29.1 SB, 18 S; 106/287.14

[56] References Cited

U.S. PATENT DOCUMENTS 4,076,763  2/1978  Thom et al. ........................... 528/28

*Primary Examiner*—Melvyn I. Marquis
*Attorney, Agent, or Firm*—Sprung, Felfe, Horn, Lynch & Kramer

[57] ABSTRACT

Polycarbodiimide is present as a solid phase in a liquid polyorganosiloxane, preferably being formed therein by mixing a polyisocyanate with the polysiloxane followed by a carbodiimidization catalyst. If the polyorganosiloxane contains hydroxyl groups it can be chemically bonded to the polycarbodiimide. The composition can be cured to solid plastic masses of superior properties by adding a curing agent for the polysiloxane.

7 Claims, No Drawings

ORGANOPOLYSILOXANES MODIFIED WITH POLY-CARBODIIMIDE

Organopolysiloxanes modified with inorganic and organic materials are in themselves known. Thus, organopolysiloxanes, or mixtures of organopolysiloxanes, mixed with inorganic fillers, such as, for example, silicon dioxide aerogels, diatomaceous earth, magnesium and/or iron oxide, with additional crosslinking agents and processing auxiliaries are used in many fields. These include, for example, the use of so-called one-component or two-component systems which cure under the action of moisture, curing being effected by the reaction of siloxanes containing OH functional groups with crosslinking and curing catalysts, such as, for example, alkyl silicates or alkyltriacyloxysilanes as well as water. Further known crosslinking systems are based on the reaction of siloxanes containing Si-H with unsaturated compounds in the presence of catalytically active metal compounds or crosslinking by organic peroxides.

The inorganic and organic modifying agents already mentioned impart different characteristics to the organopolysiloxane compositions formed therewith. Organopolysiloxanes modified with organic materials, usually polymers, include, for example, block copolymers, in which organopolysiloxane blocks are chemically linked to organic polymer blocks (for example polyethers, polyesters, polycarbonates or polycarbodiimides). Products of this type are described, for example, in the Patent Specifications: U.S. Pat. No. 3,402,192, U.S. Pat. No. 3,701,815 and U.S. Pat. No. 3,189,662. These products are prepared via multi-stage processes and are thus usually expensive to produce, and, moreover, in a comparison of properties, are generally less favorable than organopolysiloxane compositions modified with inorganic fillers.

Moreover, modified organopolysiloxane compositions which form by free radical polymerization of unsaturated organic monomers in organopolysiloxanes or by mixing corresponding constituents have been disclosed. The products which form are in some cases only compositions filled with organic polymer particles (for example a polyolefin or polystyrene) and in some cases also products in which the organic polymer is partially bonded to the siloxane by grafting. Compositions of this type and processes for their preparation are described, for example, in the Patent Specifications: U.S. Pat. No. 2,965,593 and U.S. Pat. No. 3,627,836.

The properties of these last-mentioned products are, however, still unsatisfactory for a number of applications. The polymers which have been disclosed for filling or grafting are formed from one or more unsaturated monomers which are polymerizable, such as, for example, ethylene, vinyl chloride or 1,3-butadiene.

These organic polymers as a rule have a low stability to high temperatures. They impart this adverse property to the cured organopolysiloxane compositions formed therefrom. In addition, they have adverse elastomer properties, such as, for example, high permanent set. Furthermore, they considerably impair the mechanical properties at elevated temperature (for example the tensile strength). The long term stability to heat, which otherwise is a distinguishing feature of the organopolysiloxanes, is lost.

It is therefore an object of the present invention to provide improved organopolysiloxane compositions which, also for economic and technical reasons, meet the following conditions:

(a) The preparation of the compositions should be able to take place without high expenditure on technical apparatus and without a long reaction time, for example in commercially available stirred vessels or in mixers.

(b) The compositions prepared should be capable of flow without the use of solvents and have an adequately high stability on storage. After vulcanization has taken place, they must be cured tack-free.

(c) After vulcanization, the new compositions should be distinguished, compared with other organically modified organopolysiloxane compositions, by improved thermal properties, such as, for example, long term stability to heat, and improved mechanical properties at elevated temperature. In addition, an improvement in the adhesion characteristics is desirable.

The present invention relates to polysiloxanes modified with polycarbodiimide, which are characterized in that the polysiloxane and polycarbodiimide are present as discernible phases, in some cases with partial chemical and/or physical bonding to one another.

The improved organopolysiloxane compositions according to the present invention are thus organopolysiloxane mixtures filled with polycarbodiimide, which mixtures comprise the following two phases: (i) a continuous phase of an organopolysiloxane liquid and (ii) a non-continuous phase of finely divided particles of a carbodiimide polymer which has been obtained by a polycondensation reaction of the corresponding monomer or mixture of monomers in the presence of the organopolysiloxane liquid and of a carbodiimidization catalyst. Advantageously the polycarbodiimide is present in about 3 to 80% by weight of the total mixture and preferably about 5 to 70% by weight.

The organopolysiloxane compositions, filled with polycarbodiimide, of the present invention are prepared by intensive mixing of the organopolysiloxane liquid with poly-isocyanates or mixtures thereof, in the presence of a catalyst which accelerates the formation of the carbodiimide, or by mixing the organopolysiloxane liquid with polycarbodiimides which are prepared in situ and are in themselves known.

The organopolysiloxane liquids preferred for the use according to the invention are characterized by the following general formula:

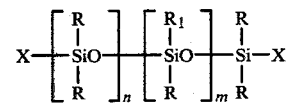

in which

R represents an optionally substituted alkyl, alkenyl or halogenoalkyl radical with up to about 10 C atoms, $R_1$ represents hydrogen or an optionally substituted alkyl, alkenyl, aryl or halogenoalkyl radical with up to about 10 C atoms;

X is, for example, hydroxyl-, vinyl- or methyl-;

n=2 to about 1,000, preferably about 50 to 300, and m=0 to about 50, preferably 0 to about 10.

Mixtures of different polysiloxanes can also be used.

Furthermore, silicone resins such as are obtainable, for example, by cohydrolysis of methyltrichlorosilane and dimethyldichlorosilane are also suitable for the use according to the invention, on their own or as a mixture with the organopolysiloxane liquids mentioned (compare, for example, U.S. Pat. No. 2,587,295, U.S. Pat. No. 2,384,340, U.S. Pat. No. 2,584,341, U.S. Pat. No. 2,584,342, U.S. Pat. No. 2,584,343, U.S. Pat. No. 2,584,344 and U.S. Pat. No. 2,686,739).

Poly-isocyanates which can be used are those of the general formula

OCN-R'—NCO in which
R' represents an alkylene or arylene radical with preferably up to 24 C atoms which is optionally also substituted by isocyanate groups.

Starting components of this type to be employed according to the invention can be aliphatic, cycloaliphatic, araliphatic, aromatic and heterocyclic polyisocyanates, such as are described, for example, by W. Siefgen in Justus Liebigs Annalen der Chemie, 562, pages 75 to 136, for example ethylene diisocyanate, 1,4-tetramethylene diisocyanate, 1,6-hexamethylene diisocyanate, 1,12-dodecane diisocyanate, cyclobutane 1,3-diisocyanate, cyclohexane 1,3- and 1,4-diisocyanate and also any desired mixtures of these isomers, 1-isocyanato-3,3,5-trimethyl-5-isocyanatomethyl-cyclohexane (German Auslegeschrift (German Published Specification) 1,202,785), 2,4- and 2,6-hexahydrotoluylene diisocyanate and also any desired mixtures of these isomers, hexahydro-1,3- and/or -1,4-phenylene diisocyanate, perhydro-2,4'- and/or -4,4'-diphenylmethane diisocyanate, 1,3- and 1,4-phenylene diisocyanate, 2,4- and 2,6-toluylene diisocyanate and also any desired mixtures of these isomers, diphenylmethane 2,4'- and/or 4,4'-diisocyanate, naphthylene 1,5-diisocyanate, triphenylmethane 4,4',4''-triisocyanate, polyphenyl-polymethylene polyisocyanates such as are obtained by an aniline/formaldehyde condensation reaction and subsequent phosgenation and are described, for example, in British Pat. Nos. 874,430 and 848,671, perchlorinated aryl polyisocyanates such as are described, for example, in German Auslegeschrift (German Published Specification) No. 1,157,601, polyisocyanates containing carbodiimide groups such as are described in German Pat. No. 1,092,007, diisocyanates such as are described in U.S. Pat. No. 3,492,330, polyisocyanates containing allophanate groups such as are described, for example, in British Pat. No. 994,890, Belgian Pat. No. 761,626 and Netherlands Published Patent Application No. 7,102,524, polyisocyanates containing isocyanurate groups such as are described, for example, in German Pat. Nos. 1,022,789, 1,222,067 and 1,027,394 and also in German Offenlegungsschriften (German Published Specifications) Nos. 1,929,034 and 2,004,048, polyisocyanates containing urethane groups such as are described, for example, in Belgian Pat. No. 752,261 or in U.S. Pat. No. 3,394,164, polyisocyanates containing acylated urea groups according to German Pat. No. 1,230,778, polyisocyanates containing biuret groups such as are described, for example, in German Pat. No. 1,101,394, in British Pat. No. 889,050 and in French Pat. No. 7,017,514, polyisocyanates prepared by telomerization reactions such as are described, for example, in Belgian Pat. No. 723,640, polyisocyanates containing ester groups such as are mentioned, for example, in British Pat. Nos. 965,474 and 1,072,956, in U.S. Pat. No. 3,567,763 and in German Pat. No. 1,231,688, and reaction products of the abovementioned isocyanates with acetals according to German Pat. No. 1,072,385.

It is also possible to employ the distillation residues, containing isocyanate groups, which are obtained from the industrial preparation of isocyanates, optionally dissolved in one or more of the abovementioned polyisocyanates. Furthermore, it is possible to use any desired mixtures of the abovementioned polyisocyanates.

As a rule, the polyisocyanates which are industrially readily available are preferred, for example 2,4- and 2,6-toluylene diisocyanate and also any desired mixtures of these isomers ("TDI"), polyphenyl-polymethylene polyisocyanates such as are prepared by an aniline/formaldehyde condensation reaction and subsequent phosgenation ("crude MDI") and polyisocyanates containing carbodiimide groups, urethane groups, allophanate groups, isocyanurate groups, urea groups or biuret groups ("modified polyisocyanates").

If polycarbodiimides are employed directly, the substances which are in themselves known, such as are described, for example, in German Offenlegungsschrift (German Published Specification) No. 2,318,406, can be used.

The carbodiimidization of the isocyanates used is effected in a manner which is in itself known by bringing together the isocyanate component or components with a suitable amount of a catalyst which accelerates the carbodiimidization reaction. Suitable catalysts for this purpose are the known catalysts, especially phospholine oxides:

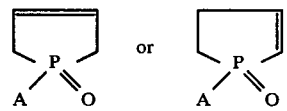

(A=alkyl-, for example methyl-, ethyl- or phenyl-) or mixtures thereof, which can also be substituted in the ring, or the corresponding phospholanes and phosphetanes,

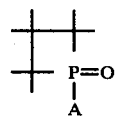

amongst which 1-methyl-1-oxophospholine (mixture of isomers) is preferred because it is more readily available.

Surprisingly, these mixtures are stable and suitable for the preparation of molding compositions which can be cured to give elastomers.

In general, most of the solid particles of the homopolymer or copolymer have an average diameter of less than about 0.4 and up to 10 microns and a few of the particles have a diameter of less than about 0.3 microns.

The carbodiimide-modified polysiloxanes according to the invention are advantageously prepared by mixing an α,ω-dihydroxypolysiloxane with about 5 to 80% by weight (preferably about 10–60% by weight, based on the polymer mixture) of a poly-functional isocyanate, or a mixture of several isocyanates, at room temperature or elevated temperature (up to about 160° C.), while stirring (if necessary in a mixer or kneader) and then carrying out the carbodiimidization reaction, while stirring, by adding catalytic amounts (about 0.01–2%) of phospholine oxide. The $CO_2$ formed during the reaction is removed from the composition at slightly elevated temperature and if necessary in vacuo.

A modified process for the preparation of the compositions, with which the requisite amount of $\alpha,\omega$-dihydroxypolysiloxane is initially introduced together with the carbodiimidization catalyst and the mixture is stirred and the corresponding amount of isocyanate or isocyanate mixture is metered in at a uniform rate and continuously in the course of a preset time, has proved particularly advantageous. The addition of the isocyanate or of the isocyanate mixture is preferably effected at temperatures of about 25° to 140° C., preferably of about 50° to 110° C.

The rate of the addition of the isocyanate is generally so regulated that the evolution of $CO_2$ which occurs still allows homogeneous distribution of the carbodiimide formed and excessive swelling of the composition is prevented. In general this will be the case in the course of about 1 to about 8 hours—depending on the batch size.

The state of fine division of the carbodiimide phase distributed in the organosiloxane phase is dependent on the stirring speed, on the temperature during the mixing-in process and on the viscosity of the organosiloxane phase.

The viscosity of the resulting system rises considerably during the mixing-in process and is dependent on the initial viscosity of the siloxane component used, on the degree of filling by the polycarbodiimide produced or worked in and on the degree of distribution of the enclosed phase (compare, for example, P. Sherman, Research (London) 8, 396 (1955)).

The resulting carbodiimide-modified polysiloxanes are white, usually non-transparent, flowable and crosslinkable compositions of medium to high viscosity which can be cured by many of the customary catalysts which are suitable for the silanol condensation.

Crosslinking agents which can be used are the same as those which are conventionally employed for the preparation of one-component or two-component systems. Examples of such substances which can be used are alkoxysilicon compounds, tetraalkoxysilanes, alkyl polysilicates and acyloxysilicon compounds.

The preparation of the one-component or two-component compositions based on the polycarbodiimide/polysiloxane copolymers according to the invention is effected by mixing the polycarbodiimide/siloxane composition with the crosslinking component and optionally the fillers and/or plasticizers in a commercially available mixer or kneader. The said formulations can also contain fillers and plasticizers, in addition to crosslinking agents and the curing catalyst. Fillers which can be used are, for example, ground quartz, chalk or diatomaceous earth or pyrogenic $SiO_2$ produced in the gas phase or other finely divided metal oxides.

As mentioned, plasticizers can be added if required. The plasticizers employed are liquid inert polydiorganosiloxanes, for example polydimethylsiloxanes stopped by $\alpha,\omega$-trimethyl-siloxy end groups.

The water required for vulcanizing the copolymers can be supplied by atmospheric humidity or by direct mixing into the curable copolymer formulations.

Polycarbodiimide-modified organopolysiloxane compositions can be used either, as already mentioned, in bulk on their own or as an additive in other polymer compositions.

They are distinguished by improved properties in respect of the stability to high temperatures, the tensile strength at elevated temperature and lower permanent set.

Polycarbodiimide-modified organopolysiloxane compositions which cure to elastomers at room temperature display, after they have been cured, outstanding adhesion, which is stable to the action of moisture, on a concrete substrate and this is achieved without the use of so-called primer substances.

As an additive component to, for example, silicone hot-vulcanized mixtures, the polycarbodiimide-modified organopolysiloxane compositions improve the resistance to water vapor of these mixtures.

The invention is illustrated in more detail in the following examples. Unless expressly stated otherwise, the percentage data given below denote percentages by weight.

EXAMPLE 1

This example describes the preparation of a dispersion of 24% of a polycarbodiimide based on toluylene diisocyanate and 76% of $\alpha,\omega$-dihydroxypolydimethylsiloxane.

A mixture of 1,750 g of polydimethylsiloxane with terminal hydroxyl groups and a viscosity of 18,000 centipoise (at 20° C.) and 750 g of a mixture of isomers comprising 80% of 2,4-toluylene diisocyanate and 20% of 2,6-toluylene diisocyanate are stirred for 4 hours at 25° C. with an anchor stirrer. 1.25 g of 1-methylphospholine oxide are added, after which gas is evolved for a short time. The mixture is stirred first for 3 hours at 25° C. and then for a further 2.5 hours at 50° C.

A white, flowable dispersion with a viscosity of about 68,500 centipoise is obtained. The average particle size of the dispersed polycarbodiimide is about 3 microns.

The formulation of a cold-curing one-component system is prepared from the composition and the properties of the cured product are given in Example 8, Table I.

The adhesion of a sample of this one-component system applied to concrete is good and unchanged even after storing for 4 weeks under water.

EXAMPLE 2

1,528 g of the polydimethylsiloxane of Example 1 and 655 g of the toluylene diisocyanate of Example 1 are mixed for 1 hour at 80° C. 1.1 ml of methylpholine oxide are added and the mixture is stirred for a further 3 hours at 80° C.

A white homogeneous dispersion with a viscosity of 53,600 cP at 20° C. and a NCO content of 0.2% is obtained.

The formulation of a cold-curing composition and also the properties of the cured product are given in Example 8, Table 1.

The adhesion of a sample applied to concrete is good after storing for 4 weeks under water.

EXAMPLE 3

1,400 g of the polydimethylsiloxane of Example 1 and 300 g of the toluylene diisocyanate of Example 1 are mixed at room temperature and the mixture is then heated to 80° C., while stirring, and stirred for 1 hour at this temperature. 1.0 ml of phospholine oxide is then added, whereupon the evolution of gas starts. The mixture is now cooled to room temperature in the course of 1 hour, while stirring. After cooling has taken place, 300 g of toluylene diisocyanate are added to the mixture and the resulting mixture is stirred for 3 hours at room temperature.

A white, flowable dispersion with a viscosity of 133,000 cP (20° C.) is obtained. The average particle size of the dispersed carbodiimide phase is 1–2 microns.

The formulation of a cold-curing composition and also the properties of the cured product are given in Example 8, Table 1 (one-component system) and in Example 9 (two-component system).

EXAMPLE 4

1,500 g of the polydimethylsiloxane of Example 1 are warmed to 45° C. and stirred for 30 minutes and 1,500 g of the toluylene diisocyanate of Example 1 are added. After the addition has taken place, the mixture is stirred for 30 minutes and 1.5 g of phospholine oxide are then added, whereupon the evolution of gas starts. The composition is stirred for a further 3 hours, during which time its temperature rises to about 65° C.

The resulting product is white and homogeneous and has a viscosity of about 800,000 cP. Its content of NCO group was determined as 1.6%.

The formulation of a cold-curing composition and the properties of the cured product are given in Example 8, Table 1.

EXAMPLE 5

This example illustrates the preparation of a dispersion of 43% of a polycarbodiimide based on toluylene diisocyanate and 57% of a polydimethylsiloxane having silanol end groups ($\eta = 18{,}000$ cP).

1,500 g of the polydimethylsiloxane of Example 1 are warmed to 45° C. and 1,500 g of the toluylene diisocyanate of Example 1 are added. The mixture is stirred for 30 minutes and 1.5 g of phospholine oxide are added. The subsequent stirring time is 3 hours, during which time the mixture warms to about 60° C.

A white, homogeneous and flowable product with a viscosity of 200,000 cP is obtained. The content of NCO groups, which is determined by titration, is 3.1%.

The formulation of a cold-curing composition and also the properties of the cured product are given in Example 8, Table 1.

EXAMPLE 6

1,500 g of the polydimethylsiloxane of Example 1 are warmed in a vessel to 80° C. and 1.5 g of phospholine oxide are added. 1,500 g of the toluylene diisocyanate of Example 1 are metered in at a uniform rate in the course of 2 hours, while stirring, the temperature being kept constant. After the addition has ended, the mixture is stirred for a further 1 hour at 80° C. and cooled to room temperature.

The resulting dispersion has a viscosity of about 700,000 cP and a content of NCO groups of 1.6%.

The formulation of a cold-curing composition and also the properties of the cured product are given in Example 8, Table 1.

The resulting product was employed as a stabilizing additive against hydrolytic decomposition of hot-vulcanizable silicone rubber. The results obtained are illustrated in Example 10, Table 3.

EXAMPLE 7

500 g of a polydimethylsiloxane with terminal hydroxyl groups and a viscosity of 10,000 cP (at 20° C.) are warmed in a vessel to 80° C. and 0.5 g of phospholine oxide is added. 500 g of the toluylene diisocyanate of Example 1 are metered into this mixture in the course of 2 hours. The product is cooled to room temperature, while stirring. A slightly yellowish homogeneous suspension with a viscosity of 130,000 cP is obtained.

The formulation of a cold-curing mixture and also the properties of the cured product are given in Example 8, Table 1.

EXAMPLE 8

This example shows, in Table 1, the formulations, as one-component systems (in % by weight), of the cold-curing organosiloxane compositions of Examples 1 to 7 and the properties of the product completely cured after 7 days at room temperature.

Two cold-curing organopolysiloxane compositions of a pure polydimethylsiloxane with terminal hydroxyl groups and a viscosity of 50,000 cP (at 20° C.) were prepared as comparison experiments A and B (formulation and properties in Table 1).

When applied to concrete and stored under water, the completely cured products A and B adhere for less than one week.

Table 1

| Example No. | 1 | 3 | 4 | 4 | 4 | 5 | 5 | 5 | 6 | 7 | 2 | A | B |
|---|---|---|---|---|---|---|---|---|---|---|---|---|---|
| Dispersion of example no. [%] | 64.4 | 64.4 | 94.5 | 64.4 | 55.9 | 94.5 | 64.4 | 55.9 | 55.9 | 55.9 | 64.4 | 64.4* | 55.9* |
| polydimethylsiloxane, stopped by trimethylsilyl end groups, with a viscosity of 1,400 cP | 25.2 | 25.2 | | 25.2 | 20.9 | | 25.2 | 20.9 | 20.9 | 20.9 | 25.2 | 25.2 | 20.9 |
| ethyltriacetoxysilane | 4.2 | 4.2 | 4.7 | 4.2 | | 4.7 | 4.2 | | | | 4.2 | 4.2 | |
| t-butoxydiacetoxysilane | 0.9 | 0.9 | | 0.9 | | | 0.9 | | | | 0.9 | 0.9 | |
| silica 130 m²/g | 5.2 | 5.2 | | 5.2 | 3.7 | | 5.2 | 3.7 | 3.7 | 3.7 | 5.2 | 5.2 | 3.7 |
| dibutyl-tin diacetate | 0.01 | 0.01 | 0.8 | 0.1 | | 0.8 | 0.1 | | | | 0.01 | 0.01 | |
| tetraisobutyl-titanate | | | | | 4.8 | | | 4.8 | 4.8 | 4.8 | | | 4.8 |
| powdered CaCO₃ | | | | | 8.4 | | | 8.4 | 8.4 | 8.4 | | | 8.4 |
| dibutyl-tin dilaurate benzamide crosslinking agent | | | | | 1.0 | | | 1.0 | 1.0 | 1.0 | | | 1.0 |
| methyl-ethoxy-bis-[N-methyl-benzamido]-silane | | | | | 5.2 | | | 5.2 | 5.2 | 5.2 | | | 5.2 |
| Properties | | | | | | | | | | | | | |
| Shore A hardness DIN 53 505 | 21 | 7 | 31 | 16 | 24 | 32 | 21 | 20 | 18 | 20 | 9 | 12 | 20 |
| modulus of elasticity 100% | | | | | | | | | | | | | |

Table 1-continued

| Example No. | 1 | 3 | 4 | 4 | 4 | 5 | 5 | 5 | 6 | 7 | 2 | A | B |
|---|---|---|---|---|---|---|---|---|---|---|---|---|---|
| DIN 53 504 [Kp/cm²] test pieces according to BV tensile strength | 3.10 | 2.48 | 9.29 | 4.01 | 4.54 | 13.8 | 5.20 | 4.73 | 3.38 | 3.94 | 1.69 | 3.62 | 4.73 |
| DIN 53 504 [Kp/cm²] elongation at break | 9.03 | 10.5 | 16.1 | 11.7 | 10.8 | 31.6 | 19.5 | 11.3 | 9.99 | 10.2 | 12.1 | 8.45 | 11.3 |
| DIN 53 501 [%] | 486 | 1308 | 361 | 1010 | 480 | 212 | 684 | 380 | 574 | 422 | 1308 | 584 | 380 |

*Polydimethylsiloxane with terminal hydroxyl groups and a viscosity of 50,000 cP at 20° C.

Table 2

|  | Example 7 Acetate cross-linking agent | Example 7 Benzamide cross-linking agent | Silicone acetate cross-linking agent | Silicone benzamide cross-linking agent |
|---|---|---|---|---|
| modulus [MPa] | 0.34 | 0.38 | 0.40 | 0.14 |
| tensile strength [MPa] | 1.26 | 0.74 | 1.40 | 0.90 |
| tensile strength at 120° C. [MPa] | 1.37 | 0.69 | 1.41 | 0.86 |
| permanent set [%] 72 hours/ | 23.3 |  | 59.4 |  |
| 25° C. | 22.6 |  | 58.5 |  |
| 25 hours/ | 15.4 |  | 100.0 |  |
| 70° C. | 13.7 |  | 99.3 |  |
| adhesion to concrete | >90% | 80–90% | 80% | 90% |
| ASTM III kerosine | 0–10% by volume | 0–10% by volume | 0–10% by volume | 0–10% by volume |
| swelling after 24 hours | 640% by volume | >1000% by volume | >1000% by volume | >1000% by volume |
| stability to high temperatures: Shore A hardness, |  |  |  |  |
| 0-value | 25 | 28 | 21 | 16 |
| after 2 weeks, 160° C. | 35 | 38 | 18 | 16 |
| after 2 weeks, 200° C. | 25 | 53 | 14 |  |
| after 2 weeks, 230° C. | destroyed | brittle | 68 | destroyed |
| loss in weight after 160° C. 30 days | — | 1.3% | 0.15% |  |
| 200° C. | 0.8% | 3.7% | 0.77% |  |
| 230° C. | 2.0% | 5.2% | 3.2% |  |
| acceptance of top coats*: Alkyd cover lacquer |  |  |  |  |
| 1 coat: | + | − | − | − |
| 2 coats: | ++ | − | + | − |
| Alkyd cover lacquer + 5% of a top-coating auxiliary |  |  |  |  |
| 1 coat: | +++ | + | +++ | + |
| 2 coats: | +++ | ++ | ++ | + |

* − craters, no levelling
+almost good, no craters
++good, small defects
+++very good

EXAMPLE 9

This example illustrates the preparation of a cold-curing composition (two-component system) and of the cured product thereof.

95 parts of the dispersion of Example 3 and 5 parts of a crosslinking agent which comprises 97% ethyl silicate and 3% dibutyl-tin dilaurate are mixed. The mixture is allowed to cure for several hours at room temperature and then for 5 hours at 65° C.

The completely cured product has the following properties: Crosslinked with 5% of a mixture of 97 parts of monomeric ethyl silicate and 3 parts of dibutyl-tin dilaurate

| Mechanical values | |
|---|---|
| tensile strength | 5.2 kg/cm² |
| elongation | 110% |
| Shore A hardness | 33 |
| tear propagation resistance | |
| DIN 53 515 | 1.4 kp/cm |
| ASTM 624 B | 2.2 kg/cm |
| ASTM 624 C | 3.9 kp/cm |
| density | 1.043 g/cm³ |

| Change in the Shore hardness at different temperatures | | | |
|---|---|---|---|
|  | 1 day | 10 days | 1 month |
| 150° C. | 34 | 35 | 35 |
| 180° C. | 35 | 30 | 27 |
| 200° C. | 36 | 20 | 18 |
| 230° C. | 32 | b 20 | b 25 |
|  |  | t 12 | t 14 |
| 250° C. | 23 | b 22 | b 24 |
|  |  | t 12 | t 13 | b = bottom
t = top

EXAMPLE 10

This example illustrates the stability of the silicone rubber towards hydrolytic decomposition when a dispersion of Example 6 is added.

The hydrolysis was carried out in a heat-sealed tube with 50 mg $H_2O/20$ cm$^3$ of air at 236° C.

The formulation, in parts by weight, of test products A and B is given in Table 2.

The product characteristics of the vulcanized products are given in Table 3.

Product A contained 100 parts by weight of a hot-vulcanizable silicone rubber and 0.6 part by weight of dicumyl peroxide and had a density of 1.229 g/cm$^3$. Product B had the same formulation, but additionally contained 1.0 part by weight of the dispersion according to Example 6 (resulting density 1.225).

Table 3

|  | I | | II | | III | |
|---|---|---|---|---|---|---|
|  | A | B | A | B | A | B |
| strength kg/cm$^2$ | 83 | 90 | 76 | 85 | 41 | 68 |
| elongation % load at 100% | 340 | 345 | 285 | 300 | 290 | 330 |
| elongation load at 300% | 28 | 28 | 31 | 28 | 19 | 24 |
| elongation | 76 | 82 | — | 85 | — | 61 |
| Shore A hardness | 66 | 64 | 64 | 65 | 63 | 65 |
| impact resilience | 27 | 30 | 28 | 26 | — | — |

I 10' 170° C. press
II 10' 170° C. press + 6 hours hot air at 200° C.
III 10' 170° C. press + 6 hours hot air at 200° C. + 4 hours hot air at 236° C.

EXAMPLE 11

This example illustrates the preparation of a dispersion of 64% of polycarbodiimide based on toluylene diisocyanate and 36% of a polydimethylsiloxane with silanol end groups ($\eta = 10,000$ cP).

300 g of the polydimethylsiloxane of Example 7 are heated to 80° C. 0.5 g of phospholine oxide is added and 700 g of the toluylene diisocyanate of Example 1 are added dropwise at 80° C. in the course of 2 hours. After the addition has ended, the mixture is stirred for a further hour at 80° C.

A white, homogeneous, crosslinkable, non-flowing mixture is obtained.

EXAMPLE 12

250 g of the polydimethylsiloxane of Example 1 (18,000 cP) and 250 g of the polydimethylsiloxane of Example 2 (1,000 cP) are heated together with 0.5 g of phospholine oxide to 80° C. 500 g of the toluylene diisocyanate of Example 1 are metered into the mixture in the course of 2 hours, at 80° C. After the addition, the mixture is stirred for a further 1 hour at 80° C.

The cream-colored product has a viscosity of 100,000 cP and is crosslinkable.

EXAMPLE 13

216 g of the polydimethylsiloxane of Example 7 and 280 g of a polydimethylsiloxane with methyl end groups and a viscosity of 1,400 cP (20° C.) are heated together with 0.5 g of phospholine oxide to 80° C. 504 g of the toluylene diisocyanate of Example 1 are metered in at a uniform rate in the course of 2 hours, while stirring continuously. After the addition has ended, the mixture is stirred for a further 1 hour at 80° C.

The product is yellowish and homogeneous and has a viscosity of 56,400 cP.

EXAMPLE 14

This example illustrates the preparation of a non-flowable composition of 43% of polycarbodiimide based on toluylene diisocyanate and 57% of a polydimethylsiloxane with silanol end groups ($\eta = 10,000$ cP) in a solvent.

100 g of the polydimethylsiloxane of Example 1 are dissolved in 200 ml of dry toluene and 100 g of the toluylene diisocyanate of Example 1 are added. The mixture is stirred at 110° C. for 2 hours. The mixture is cooled to 50° C. and 0.1 of phospholine oxide is added to the mixture. The mixture is stirred for a further 1 hour at 50° C., heated to 110° C. and left at this temperature until the evolution of CO$_2$ has ceased.

After evaporating off the solvent used, a slightly yellowish, non-flowing, rubber-like product is obtained.

EXAMPLE 15

This example illustrates the preparation of a dispersion of 40% of a polycarbodiimide based on 4,4'-diisocyanatodiphenylmethane and 60% of a polydimethylsiloxane with silanol end groups ($\eta = 50,000$ cP). The polycarbodiimide was employed in powder form.

A mixture of 1.5 kg of a polydimethylsiloxane with terminal silanol groups and a viscosity of 50,000 cP (20° C.) and 1 kg of a polycarbodiimide powder based on 4,4'-diisocyanatodiphenylmethane (1.8% of NCO) are mixed for 4 hours at room temperature in a planetary mixer at 80 revolutions/minute.

A white, homogeneous, non-flowable, crosslinkable paste is obtained.

EXAMPLE 16

This example illustrates the preparation of a dispersion of 30% of a polycarbodiimide based on 4,4'-diisocyanatodiphenylmethane, employed in the form of a powder, and 70% of a polydimethylsiloxane with silanol end groups ($\eta = 18,000$ cP) in a solvent.

60 g of a polycarbodiimide powder based on 4,4'-diisocyanatodiphenylmethane with the following formula

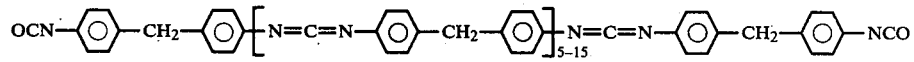

are dissolved in dry toluene. 140 g of the polydimethylsiloxane of Example 1 are added to the solution. The mixture is stirred for 3 hours at room temperature and the toluene is then distilled off under 15 mm Hg and at 60° C.

A yellow, flowable and crosslinkable dispersion is obtained.

EXAMPLE 17

This example illustrates the preparation of a dispersion of 45% of polycarbodiimide based on 4,4'-diisocyanatodiphenylmethane and 55% of a polydimethylsiloxane with silanol end groups ($\eta = 18,000$ cP).

750 g of the polydimethylsiloxane of Example 1 are heated to 80° C. and 0.75 ml of phospholine oxide is added. 750 g of 4,4'-diisocyanatodiphenylmethane are metered in at 80° C. in the course of 2 hours, while stirring continuously, and after the addition has ended the mixture is stirred for a further 1 hour at 80° C.

A white, homogeneous, crosslinkable product with a viscosity of 336,000 cP is obtained.

EXAMPLE 18

1,425 g of the polydimethylsiloxane of Example 1 are mixed with 0.75 ml of phospholine oxide at 80° C. 75 g of hexamethylene 1,6-diisocyanate are added to this mixture in the course of 2 hours, while stirring, and the resulting mixture is then stirred for a further 1 hour at 80° C.

A white, viscous and crosslinkable product is obtained.

EXAMPLE 19

This example illustrates the preparation of a dispersion of 9% of a polycarbodiimide based on a trisisocyanate, containing biuret groups and 91% of a polydimethylsiloxane with silanol end groups ($\eta = 18,000$ cP).

900 g of the polydimethylsiloxane of Example 1 and 100 g of a trisisocyanate of the following formula

OCN(CH$_2$)$_6$N[CONH(CH$_2$)NCO]$_2$ are mixed for 1 hour at 50° C. 0.5 ml of phospholine oxide is added and the mixture is stirred for a further 1.5 hours at 50° C. The mixture is heated to 80° C. and stirred for a further 2.5 hours.

After cooling to room temperature, a white, homogeneous and crosslinkable product with a viscosity of 27,000 cP is obtained.

EXAMPLE 20

This example illustrates the preparation of a dispersion of 44% of a polycarbodiimide based on a mixture of the toluylene diisocyanate of Example 1 and 4,4'-diisocyanatodiphenylmethane in a mixing ratio of 1:1 and 56% of a polydimethylsiloxane with silanol end groups ($\eta = 18,000$ cP).

600 g of the polydimethylsiloxane of Example 1 are warmed to 80° C. and 0.6 ml of phospholine oxide is added. 600 g of a mixture of the toluylene diisocyanate of Example 1 and 4,4'-diisocyanatodiphenylmethane (weight distribution 1:1) are metered in at a uniform rate at 80° C. in the course of 2 hours and the mixture is then stirred at the same temperature for a further 1 hour.

A white, homogeneous and crosslinkable dispersion with a viscosity of 178,000 cP is obtained.

EXAMPLE 21

This example illustrates the preparation of a dispersion of 43% of a polycarbodiimide based on toluylene diisocyanate and 57% of a polydimethylsiloxane with vinyl end groups.

100 g of a polydimethylsiloxane with terminal vinyl groups and a viscosity of 4,320 cP (at 20° C.) and 0.1 ml of phospholine oxide are heated to 80° C., while stirring. 100 g of the toluylene diisocyanate of Example 1 are metered in at 80° C. in the course of 2 hours. After the addition has ended, the mixture is stirred at the same temperature for a further 1 hour and then cooled.

A yellowish dispersion with a viscosity of 15,390 cP is obtained.

In order to prepare a cold-curing formulation and a cured product therefrom, a mixture of 30 g of the dispersion prepared above and 0.5 g of a methylhydrogensiloxane of the formula

(CH$_3$)$_3$Si[OSi(CH$_3$)H]$_p$OSi(CH$_3$)$_3$ with a viscosity of about 15 cP was mixed with a drop of a solution of Pt(CO)$_2$Cl$_2$ in methylvinylsiloxane tetramer (Pt content 1.92%) and the mixture was kept in a mold at room temperature. The composition was completely cured after 12 hours.

EXAMPLE 22

This example illustrates the preparation of a dispersion of 24% of a polycarbodiimide based on toluylene diisocyanate, 43% of an α,ω-dihydroxypolydimethylsiloxane and 33% of a silicone resin.

A mixture of 400 g of the polydimethylsiloxane of Example 1 and 300 g of a silicone resin with a viscosity of 11,500 cP and a methoxy group content of 13.7% by weight, which had been prepared by cohydrolysis of 10 mols of dimethyldichlorosilane, 10 mols of diphenyldichlorosilane and 80 mols of phenyltrichlorosilane with the addition of methanol, is warmed to 80° C. and 0.5 ml of phospholine oxide are added. 300 g of the toluylene diisocyanate of Example 1 are metered in at 80° C. in the course of 2 hours, while stirring, and the mixture is stirred at the same temperature for a further 1 hour.

After cooling, a cream-colored, homogeneous and cross-linkable composition with a viscosity of 141,000 cP is obtained.

It will be appreciated that the instant specification and examples are set forth by way of illustration and not limitation, and that various modifications and changes may be made without departing from the spirit and scope of the present invention.

What we claim is:

1. A process for preparing a polysiloxane modified with polycarbodiimide characterized in that the polysiloxane and polycarbodiimide are present as discernible phases, which comprises mixing a liquid polysiloxane of the following formula:

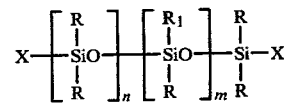

in which
R represents an optionally substituted alkyl, alkenyl or halogenoalkyl radical with up to about 10 C atoms,
R$_1$ represents hydrogen or an optionally substituted alkyl, alkenyl, aryl or halogenoalkyl radical with up to about 10 C atoms;
X is hydroxyl-, vinyl- or methyl-;
n=2 to about 1,000 and
m=0 to about 50 with a polyisocyanate of the formula

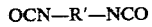

OCN—R'—NCO in which
R' represents an alkylene or arylene radical with up to 24 C atoms which is optionally also substituted by isocyanate groups,
and a catalyst which accelerates the carbodiimidization.

2. A process according to claim 1, including the further steps of adding to the composition a curing catalyst for the polysiloxane, and allowing the composition to cure.

3. The product produced by the process of claim 1.

4. The product according to claim 2, wherein the polycarbodiimide is chemically linked to the polysiloxane.

5. The product according to claim 2, wherein the polysiloxane is present as a coherent liquid phase and the polycarbodiimide is present as a non-coherent phase of finely divided particles.

6. The product according to claim 5, wherein most of the polycarbodiimide particles have an average diameter of about 0.4 to 10 microns.

7. The product produced by the process of claim 2.

* * * * *